(12) United States Patent
Srivastava et al.

(10) Patent No.: US 10,055,222 B2
(45) Date of Patent: Aug. 21, 2018

(54) DATA PROCESSOR FOR PROJECTS

(71) Applicant: Accenture Global Solutions Limited, Dublin (IE)

(72) Inventors: Krupa Srivastava, Chennai (IN); Rajendra T. Prasad, Bangalore (IN); Vijayaraghavan Koushik, Chennai (IN); Arpan Shukla, Chennai (IN); Srikanth Prasad, Bangalore (IN); Senthil Jeyachandran, Chennai (IN); Mark Lazarus, Caulfield (AU); Bhaskar Ghosh, Bangalore (IN); Mohan Sekhar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/395,155

(22) Filed: Dec. 30, 2016

(65) Prior Publication Data

US 2017/0192778 A1 Jul. 6, 2017

(30) Foreign Application Priority Data

Jan. 4, 2016 (IN) .............................. 201641000169

(51) Int. Cl.
*G06F 9/44* (2018.01)
*G06Q 10/06* (2012.01)
(Continued)

(52) U.S. Cl.
CPC .................. *G06F 8/77* (2013.01); *G06F 8/20* (2013.01); *G06F 17/3053* (2013.01); *G06F 17/30598* (2013.01); *G06Q 10/00* (2013.01)

(58) Field of Classification Search
CPC .. G06Q 10/06; G06Q 10/10; G06Q 10/06313; G06Q 30/0201; G06Q 30/0601;
(Continued)

(56) References Cited

U.S. PATENT DOCUMENTS 8,370,188 B2 * 2/2013 Bernardini ................ G06F 8/71
705/26.4
8,745,572 B2 * 6/2014 Zimmermann ..... G06F 11/3604
717/101
(Continued)

FOREIGN PATENT DOCUMENTS

AU 2016200021 8/2016
EP 2801935 A1 11/2014

OTHER PUBLICATIONS

Stojanovic et al., Alert: semantic event-driven collaborative platform for software development, Jul. 2012, 2 pages.*
(Continued)

*Primary Examiner* — Thuy Dao
(74) *Attorney, Agent, or Firm* — Harrity & Harrity, LLP (57) ABSTRACT

A device receive data regarding a project. The device may automatically evaluate the data using a set of analytics tools. The device may communicate with a client device to provide a virtual agent user interface component based on evaluating the data using the set of analytics tools. The virtual agent user interface component may include information identifying a set of alerts relating to the project and a set of recommendations relating to the set of alerts. The device may receive information indicating that a particular recommendation, of the set of recommendations is to be implemented. The device may communicate with one or more other devices to implement the particular recommendation.

20 Claims, 6 Drawing Sheets

(51) Int. Cl.
*G06Q 10/00* (2012.01)
*G06F 8/77* (2018.01)
*G06F 8/20* (2018.01)
*G06F 17/30* (2006.01)

(58) Field of Classification Search
CPC ...... G06Q 30/0282; G06Q 30/08; G06F 8/20; G06F 8/77; G06F 17/3053
See application file for complete search history.

(56) References Cited

U.S. PATENT DOCUMENTS

| | | | | |
|---|---|---|---|---|
| 9,043,745 B1* | 5/2015 | Diskin | ............... | G06Q 10/06 717/102 |
| 9,141,920 B2* | 9/2015 | Dunne | ............... | G06Q 10/06 |
| 9,251,484 B2* | 2/2016 | Cantor | ............... | G06Q 10/0633 |
| 9,406,038 B2* | 8/2016 | Cantor | ............... | G06Q 10/0633 |
| 9,563,864 B2* | 2/2017 | Cantor | ............... | G06Q 10/0633 |
| 2003/0110067 A1* | 6/2003 | Miller | ............... | G06Q 10/06 705/7.23 |
| 2005/0114829 A1* | 5/2005 | Robin | ............... | G06Q 10/06 717/101 |
| 2007/0106599 A1* | 5/2007 | Hochberg | ............... | G06Q 10/06 705/38 |
| 2007/0283325 A1 | 12/2007 | Kumar et al. | | |
| 2008/0313004 A1 | 12/2008 | Ryan et al. | | |
| 2009/0313065 A1* | 12/2009 | George | ............... | G06Q 10/06 705/7.36 |
| 2012/0017195 A1* | 1/2012 | Kaulgud | ............... | G06F 11/3692 717/101 |
| 2012/0253876 A1* | 10/2012 | Hersch | ............... | G06Q 10/06 705/7.17 |
| 2013/0191836 A1 | 7/2013 | Meyer | | |
| 2014/0122613 A1* | 5/2014 | Mashkif | ............... | G06Q 10/101 709/205 |
| 2014/0310132 A1* | 10/2014 | Culver | ............... | G06F 17/5004 705/26.81 |
| 2015/0051932 A1* | 2/2015 | Van Velzen | ............... | G06Q 10/06375 705/7.15 |
| 2015/0317584 A1* | 11/2015 | Boss | ............... | G06Q 10/06 705/7.22 |
| 2016/0048794 A1* | 2/2016 | Taylor | ............... | G06Q 10/063114 705/7.15 |
| 2016/0267412 A1* | 9/2016 | Reed | ............... | G06Q 10/06313 |
| 2017/0083290 A1* | 3/2017 | Bharthulwar | ............... | G06F 8/20 |

OTHER PUBLICATIONS

Borges et al., Learning to change projects, Sep. 2012, 8 pages.*
Australian First Examination Report corresponding to AU 2016277775, dated Jun. 16, 2017, 6 pages.
Extended European search report corresponding to EP 16207444, dated Feb. 16, 2017, 8 pages.

* cited by examiner

DATA PROCESSOR FOR PROJECTS

RELATED APPLICATION(S)

This application claims priority under 35 U.S.C. § 119 to India Provisional Patent Application No. 201641000169, filed on Jan. 4, 2016, the content of which is incorporated by reference herein in its entirety.

BACKGROUND

A project may include multiple users performing tasks relating to multiple portions of the project via multiple user devices. For example, a set of user devices may be utilized by a set of users to generate code for one or more portions of a development project. The project may be associated with a set of metrics (e.g., a progress of the project), a set of requirements (e.g., relating to a desired design of the project), or the like. The multiple user devices may connect to a server that stores information relating to the project, such as the set of metrics, the set of requirements, or the like.

SUMMARY

According to some possible implementations, a device may include one or more processors. The one or more processors may receive data regarding a project. The one or more processors may automatically evaluate the data using a set of analytics tools. The one or more processors may communicate with a client device to provide a virtual agent user interface component based on evaluating the data using the set of analytics tools. The virtual agent user interface component may include information identifying a set of alerts relating to the project and a set of recommendations relating to the set of alerts. The one or more processors may receive information indicating that a particular recommendation, of the set of recommendations is to be implemented. The one or more processors may communicate with one or more other devices to implement the particular recommendation.

According to some possible implementations, a method may include receiving, by a cloud platform of a cloud computing environment, project data associated with a project. The project data may include a first set of project metrics regarding the project and a second set of project metrics regarding another project. The method may include processing, by the cloud platform, the project data using a set of analytics tools. The method may include generating, by the cloud platform, a virtual agent user interface component based on processing the project data using the set of analytics tools. The method may include providing, by the cloud platform and using the virtual agent user interface component, information relating to the project via a user interface. The information relating to the project may include a set of alerts relating to the project and a set of recommendations relating to the set of alerts. The method may include receiving, by the cloud platform, a selection of a particular recommendation of the set of recommendations. The method may include performing, by the cloud platform, one or more actions based on the selection of the particular recommendation.

According to some possible implementations, a non-transitory computer-readable medium may store one or more instructions that, when executed by one or more processors, may cause the one or more processors to generate a virtual agent user interface component for a project management user interface. The one or more instructions, when executed by one or more processors, may cause the one or more processors to obtain project data relating to a project for management via the project management user interface. The one or more instructions, when executed by one or more processors, may cause the one or more processors to analyze the project data using a set of analytics tools. The one or more instructions, when executed by one or more processors, may cause the one or more processors to determine an alert relating to the project based on the project data. The one or more instructions, when executed by one or more processors, may cause the one or more processors to provide the alert for display via the project management user interface using the virtual agent user interface component. The virtual agent user interface component may include a visual representation of the alert.

DETAILED DESCRIPTION

The following detailed description of example implementations refers to the accompanying drawings. The same reference numbers in different drawings may identify the same or similar elements.

A user may utilize a user interface that provides information regarding a project. For example, a cloud platform may cause the user interface to be displayed to provide information regarding a status of a software development project, metrics associated with the software development project, alerts relating to the software development project, or the like. However, a project may be complex and may require many users to administer the project. Implementations, described herein, may automatically administer a project by causing the cloud platform and/or one or more client devices to take one or more actions, to generate one or more messages, or the like. In this way, user effort may be reduced for administering a project. Moreover, processing and/or memory resources that are allocated to administering the project may be reduced relative to multiple users administering the project via multiple user devices. Furthermore, based on determining trends relating to the project, efficiency in preparing for further tasks, phases, or the like may be increased, thereby increasing project completion efficiency relative to completing the project without determining trends relating to the project.

Figure 1A:
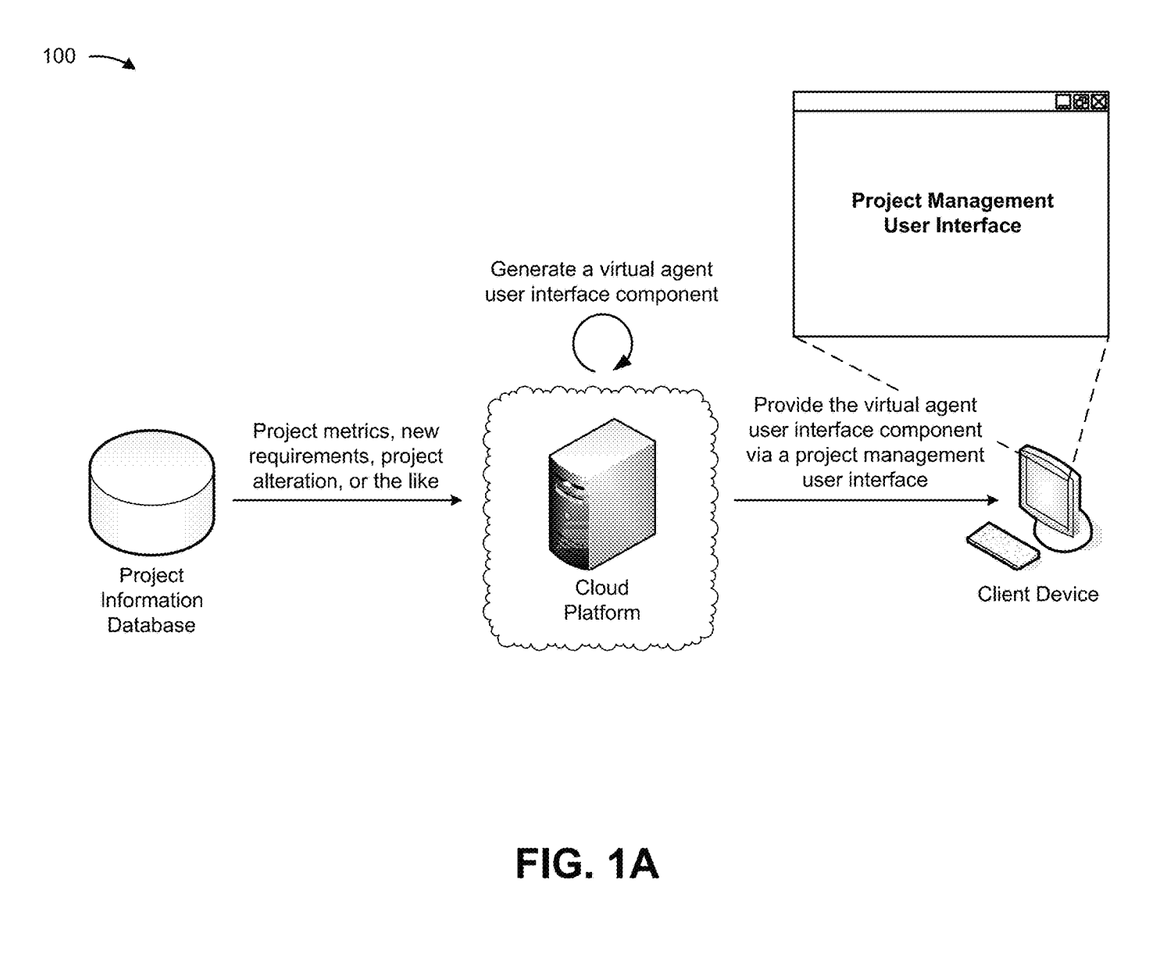
FIGS. 1A-1C are diagrams of an overview of an example implementation described herein.
Figure 1B:
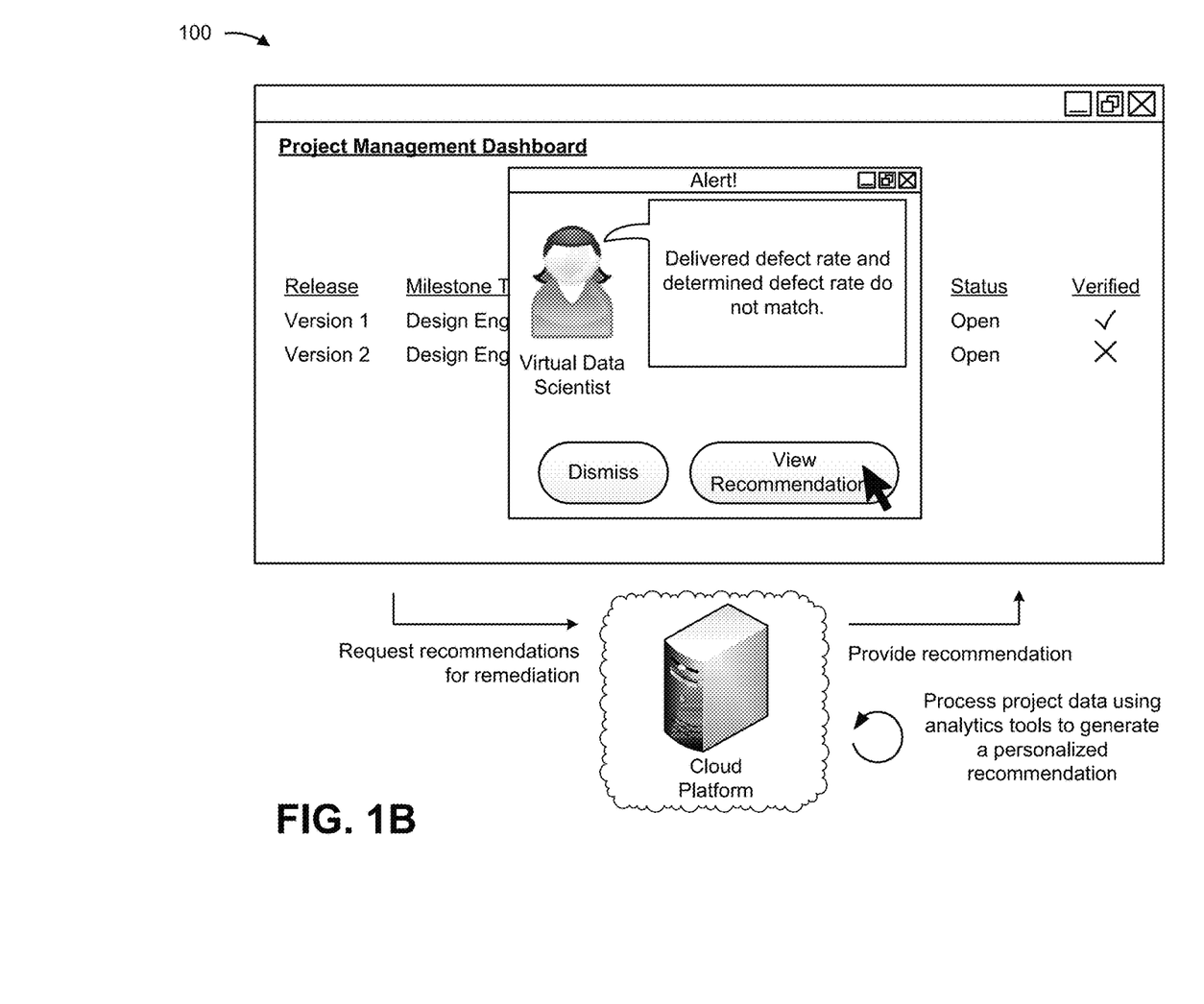
Figure 1C:
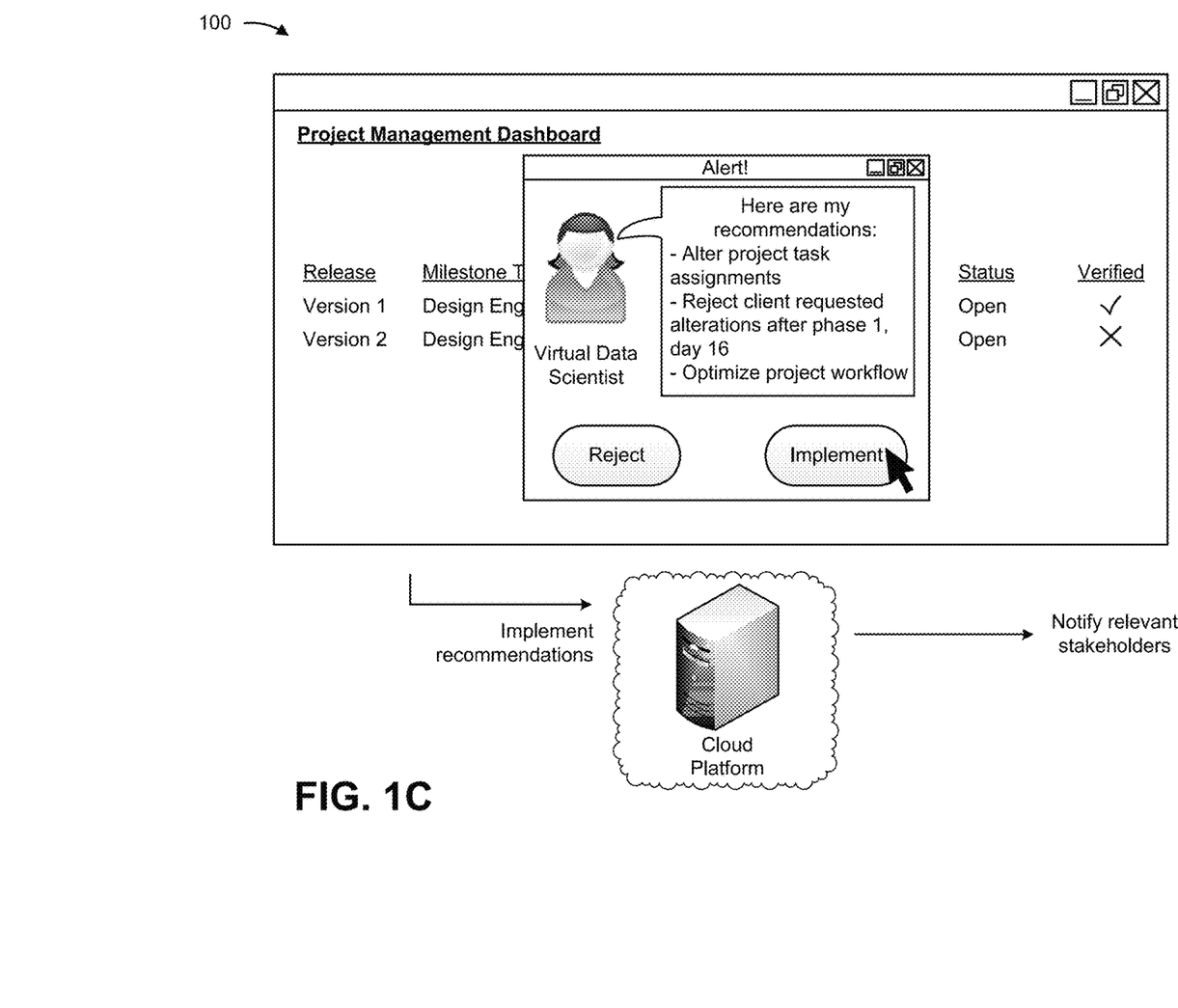

FIGS. 1A-1C are diagrams of an overview of an example implementation 100 described herein. As shown in FIG. 1A, example implementation 100 may include a cloud platform, a project information database, and a client device that provides a project management user interface. The cloud platform may receive project data regarding a project (e.g., project metrics, new requirements, change requests, etc.) from the project information database. The cloud platform may process the project data (e.g., using a set of analytics tools, such as a rules engine, a cognitive computing engine, or the like) and may generate, based on processing the project data, a virtual agent user interface component, such as an icon representing a role (e.g., a scrum master role, a data scientist role, a project manager role, or the like) performed in managing the project. The cloud platform may provide the virtual agent user interface component via the project management user interface, and may operate the virtual agent user interface component to provide information regarding the project to facilitate management of the project via the project management user interface.

As shown in FIG. 1B, the cloud platform may operate the virtual agent user interface component (e.g., representing a virtual data scientist) to provide an alert based on determining an alert condition. For example, as shown, the alert may indicate that a rate of defects that have been reported does not match an expected defect rate. Based on a user interaction with the virtual agent user interface component, the cloud platform may receive a request for recommendations to resolve the alert condition (e.g., based on the user selecting a "View Recommendations" button, as shown). Based on receiving the request, the cloud platform may process the project data (e.g., using a set of analytics tools, such as a rules engine, a cognitive computing engine, or the like) to generate one or more recommendations.

As shown in FIG. 1C, the cloud platform may operate the virtual agent user interface component to provide the generated recommendations for display. For example, as shown, the recommendations may include altering project task assignments to reduce a likelihood of failing to report defects, rejecting client requested alterations after a certain point to avoid delays, and optimizing a project workflow to improve reporting. Based on a user interaction with the virtual agent user interface component, the cloud platform may receive a request to implement the provided recommendations (e.g., based on the user selecting an "Implement" button, as shown). Additionally, or alternatively, the cloud platform may implement at least a portion of the recommendations automatically. In this case, the cloud platform may operate the virtual agent user interface component to provide an indication that such recommendations have been implemented. The cloud platform may also facilitate implementation of the recommendations, such as by providing messages to relevant stakeholders. For example, the cloud platform may communicate a new task assignment to an employee who is to complete the new task assignment.

In this way, user effort may be reduced for administering a project. Moreover, processing and/or memory resources that are allocated to administering the project may be reduced relative to multiple users administering the project via multiple user devices. Furthermore, based on determining trends relating to the project, efficiency in preparing for further tasks, phases, or the like may be increased, thereby increasing project completion efficiency relative to completing the project without determining trends relating to the project.

As indicated above, FIGS. 1A-1C are provided merely as an example. Other examples are possible and may differ from what was described with regard to FIGS. 1A-1C.

Figure 2:
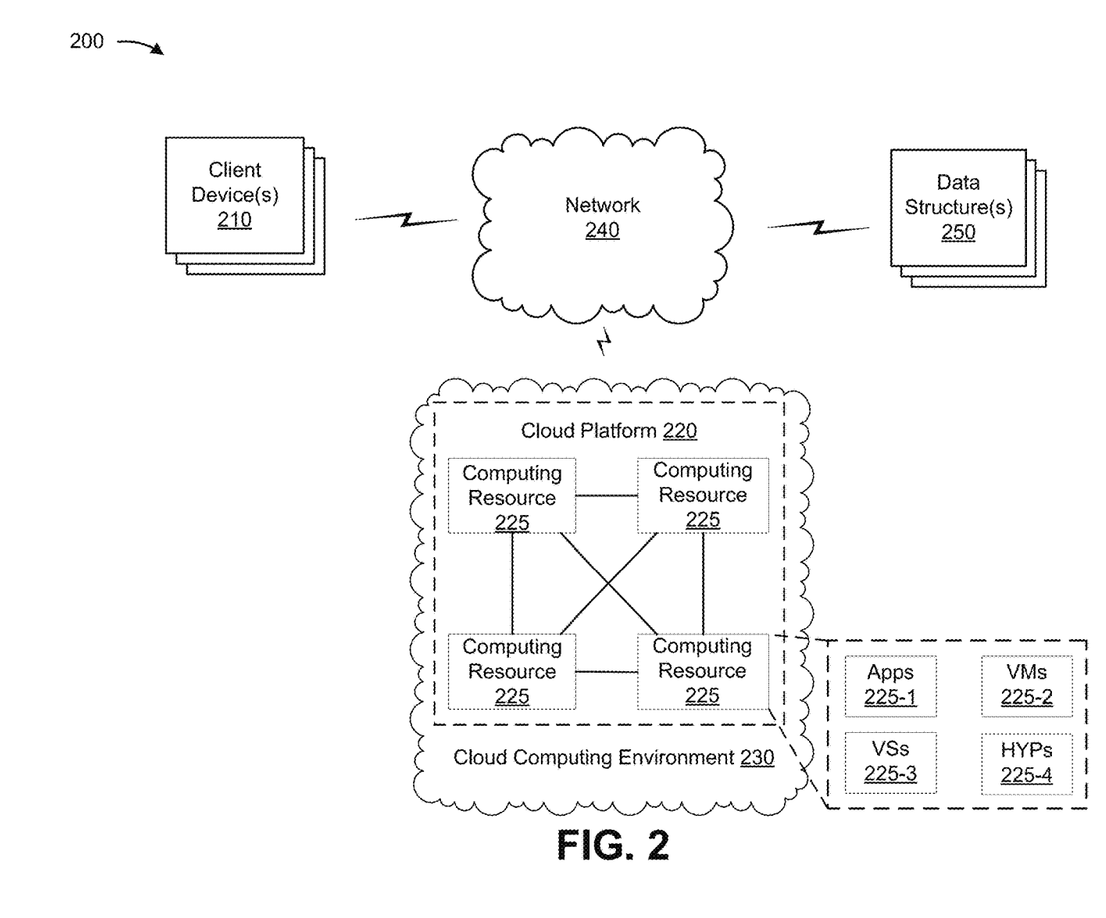
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client device(s) 210, a cloud platform 220, a cloud computing environment 230, a network 240, and one or more data structure(s) 250. Devices of environment 200 may interconnect via wired connections, wireless connections, or a combination of wired and wireless connections.

Client device 210 includes one or more devices capable of receiving, generating, storing, processing, and/or providing information associated with providing information associated with a project. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may provide a virtual agent user interface component including a set of alerts, a set of recommendations, or the like. In some implementations, client device 210 may execute a mobile application providing virtual agent functionality, such as via cloud platform 220 providing information for display in the application. In some implementations, client device 210 may limit information provided to cloud platform 220. For example, client device 210 may perform one or more computations locally, thereby permitting a user to avoid personal data, confidential data, or the like from being transmitted to another location for processing. Similarly, client device 210 may cause data to be stored locally to satisfy a data security requirement.

Cloud platform 220 includes one or more devices capable of obtaining information relating to a project, as described elsewhere herein. For example, cloud platform 220 may include a cloud server or a group of cloud servers. In some implementations, cloud platform 220 may be designed to be modular such that certain software components can be swapped in or out depending on a particular need. As such, cloud platform 220 may be easily and/or quickly reconfigured for different uses.

In some implementations, as shown, cloud platform 220 may be hosted in cloud computing environment 230. Notably, while implementations described herein describe cloud platform 220 as being hosted in cloud computing environment 230, in some implementations, cloud platform 220 may not be cloud-based (i.e., may be implemented outside of a cloud computing environment) or may be partially cloud-based. Although implementations are described herein as obtaining and analyzing data relating to a project (e.g., a development project), cloud platform 220 may be utilized to obtain and analyze data relating to another environment, such as a governmental environment, a corporate environment, an educational environment, or the like.

Cloud computing environment 230 includes an environment that hosts cloud platform 220. Cloud computing environment 230 may provide computation, software, data access, storage, etc. services that do not require end-user (e.g., client device 210) knowledge of a physical location and configuration of system(s) and/or device(s) that hosts cloud platform 220. As shown, cloud computing environment 230 may include a group of computing resources 222 (referred to collectively as "computing resources 222" and individually as "computing resource 222").

In some implementations, cloud computing environment 230 may include other cloud computing resources, such as R based statistical computing resources (e.g., an R based algorithm to compute a ticket inflow rate of trouble tickets relating to project issues based on which a virtual agent user interface component can provide preemptive recommendations), Microsoft Azure based computing resources (e.g., an Azure based algorithm to determine service level agreement compliance rates—failing to satisfy a threshold may indicate that a project has an issue), International Business Machines (IBM) Watson based computing resources (e.g., to provide user interface functionalities), or the like. In some implementations, one or more cloud computing resources may be collocated in cloud computing environment 230. Additionally, or alternatively, one or more cloud computing resources may be hosted in another cloud computing environment that may communicate with cloud computing environment 230. Integrating multiple tools designed for different project aspects (e.g., R for statistical analysis, Azure for big data computing of millions of data points relating to a project, Watson for natural language interfacing with a user), cloud computing environment 230 may enable cloud platform 220 to effectively and automatically manage a project, thereby improving accuracy of coding, reduction of coding errors, or the like. Such improvements may result in reduction of computing resources expended to complete the project, computing resources utilized when executing software managed or designed during a project, or the like.

Computing resource 222 includes one or more personal computers, workstation computers, server devices, or another type of computation and/or communication device. In some implementations, computing resource 222 may host cloud platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, one or more virtualized storages ("VSs") 222-3, and/or one or more hypervisors ("HYPs") 222-4.

Application 222-1 includes one or more software applications that may be provided to or accessed by client device 210. Application 222-1 may eliminate a need to install and execute the software applications on client device 210. For example, application 222-1 may include software associated with cloud platform 220 and/or any other software capable of being provided via cloud computing environment 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, data may be stored in a structured or unstructured format, and processing may be applied to convert between a structured and unstructured format for utilization in computations. Unstructured data may include log data from monitoring of project management tools, social media data sources, or the like (e.g., quantitative data, qualitative data, etc. regarding a project, a set of employees, or the like).

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Data structure 250 includes one or more devices capable of storing and/or providing information associated with a project. For example, data structure 250 may include a data structure storing a set of project metrics regarding a project, requirements documents describing the project, project rules relating to agile development procedures utilized to complete the project, and/or the like. Data structure 250 may include a data lake type of data structure to store millions or billions of data points relating to a project, thereby enabling big data predictions for the project that would be infeasible with other techniques using other types of data structures. Similarly, data structure 250 may utilize a data summary type of data structure, a data cube type of data structure, or the like to enable analysis of millions or billions of data points of structured or unstructured data from log files, natural language processing of social media resources, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
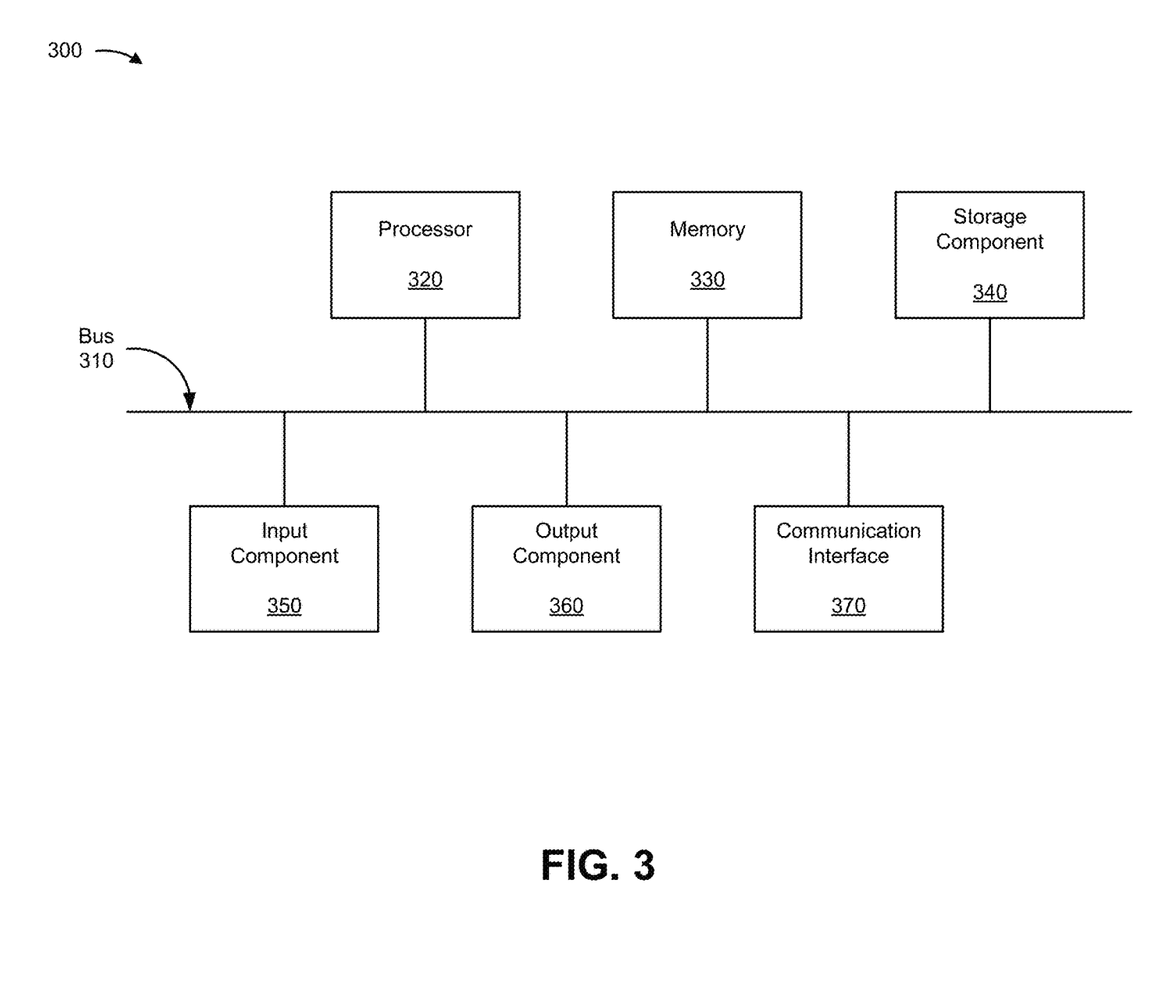
FIG. 3 is a diagram of example components of one or more devices of FIG. 2.

FIG. 3 is a diagram of example components of a device 300. Device 300 may correspond to client device 210 and/or cloud platform 220. In some implementations, client device 210 and/or cloud platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. In some implementations, storage component 340 may be a cloud storage component.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
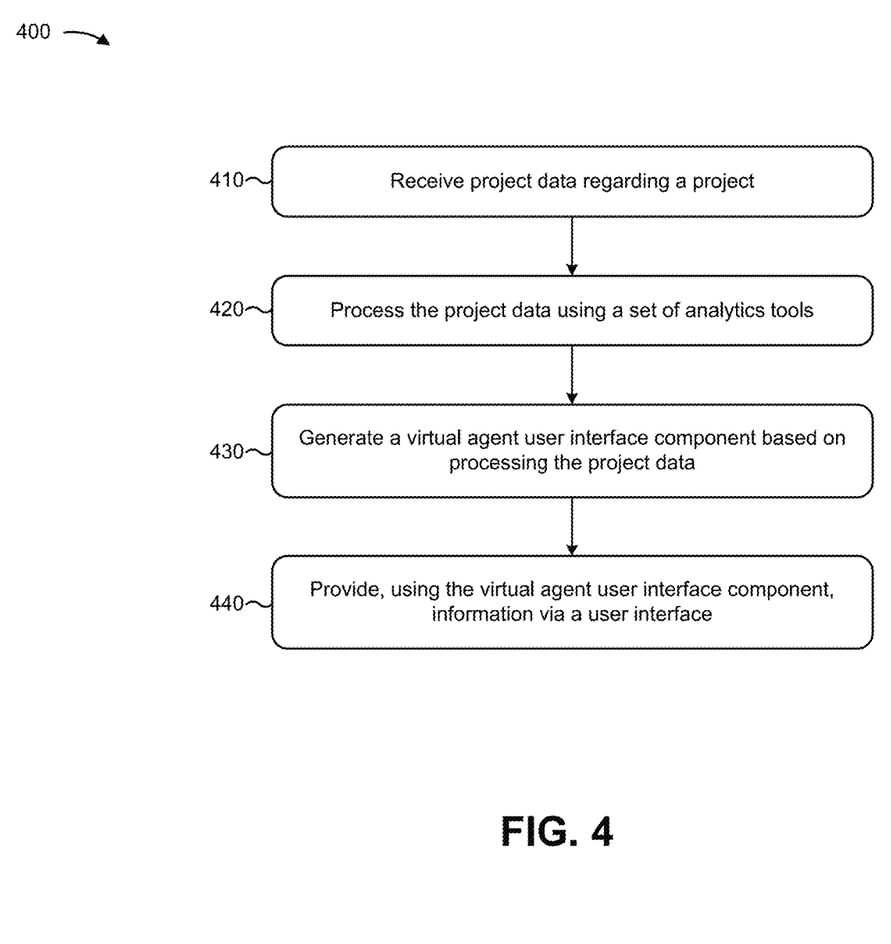
FIG. 4 is a flow chart of an example process for providing a virtual agent user interface component that provides information associated with a project.

FIG. 4 is a flow chart of an example process 400 providing a virtual agent user interface component that provides information associated with a project. In some implementations, one or more process blocks of FIG. 4 may be performed by cloud platform 220. In some implementations, one or more process blocks of FIG. 4 may be performed by another device or a group of devices separate from or including cloud platform 220, such as client device 210.

As shown in FIG. 4, process 400 may include receiving project data regarding a project (block 410). For example, cloud platform 220 may receive project data regarding a project. In some implementations, the project data may include provisioning information, such as information regarding the project management user interface, tools associated with the project management user interface, or the like. Additionally, or alternatively, the project data may include information identifying a project plan, a sprint plan (e.g., a project plan for a sprint of the project), resource information, change requests, defects, incidents, problems, work requests, or the like. In some implementations, the project data may include quantitative metrics, such as metrics relating to completed tasks, hours worked, employees assigned to projects, or the like. Additionally, or alternatively, the project data may include qualitative metrics, such as grades given to tasks, employee reviews, information identifying a set of skills of employees, or the like.

In some implementations, the project data may be associated with a particular project to be managed. Additionally, or alternatively, the project data may be associated with one or more projects other than the particular project. For example, the project data may be associated with one or more similar projects (e.g., other projects similar to the particular project). In this case, cloud platform 220 may determine a similar project based on a portion of project data associated with the particular project and the similar project, and may obtain additional data about the similar project based on determining that the similar project satisfies a threshold similarity metric. In this way, data storage and/or network traffic are reduced relative to obtaining all data regarding other projects that may not be similar. In some implementations, cloud platform 220 may determine other projects to be similar based on a client, a type, a budget, or the like.

In some implementations, cloud platform 220 may receive the project data based on providing a user interface to a user. For example, cloud platform 220 may receive the project data by providing the user interface and detecting user interactions with the user interface to identify the project data.

In some implementations, cloud platform 220 may receive the project data based on processing a document (e.g., a design document, a requirements document, etc.). In this case, cloud platform 220 may use natural language processing, machine learning, or the like, to process the document. For example, cloud platform 220 may apply natural language processing to identify language that may be associated with a timeline, a work request, an incident, or the like, and/or may extract data such as milestone dates, time estimates, identification of particular employees or teams, or the like. Additionally, or alternatively, cloud platform 220 may apply machine learning to identify similar projects based on identified similarities in relevant terms, patterns, or the like.

In some implementations, cloud platform 220 may receive the project data based on obtaining the project data from a set of data structures 250. In some implementations, cloud platform 220 may receive the project data based on crawling the web. In some implementations, cloud platform 220 may receive the project data based on using a set of application programming interface (API) calls to obtain the project data from the project management user interface, from other tools, or the like.

As further shown in FIG. 4, process 400 may include processing the project data using a set of analytics tools (block 420). For example, cloud platform 220 may process the project data using a set of analytics tools (e.g., a rules engine, a cognitive computing engine, or the like). In some implementations, cloud platform 220 may determine a set of rules. For example, cloud platform 220 may determine a set of rules based on a categorization of a delivery type of the project (e.g., agile delivery, application delivery, application maintenance, factory management, etc.). In this case, based on the type of project, cloud platform 220 may utilize a rubric of a set of rules for the type of project process, and may apply the rules to the project data. In some implementations, cloud platform 220 may apply the set of rules to project data to generate a set of schedules, a set of tasks, a set of deliverables, a set of alerts, or the like.

In some implementations, cloud platform 220 may utilize a cognitive computing engine. For example, cloud platform 220 may utilize a cognitive computing engine to perform a machine learning technique, a natural language processing technique, and/or other big data techniques. In this case, cloud platform 220 may utilize the cognitive computing engine to analyze the project data. For example, cloud platform 220 may analyze data regarding thousands of prior projects to train the cognitive computing engine, and may utilize the cognitive computing engine to analyze the project data after training the cognitive computing engine. In this way, a likelihood of success of the project is improved relative to managing the project without analyzing project data based on past project data relating to thousands of other projects.

In some implementations, cloud platform 220 may identify an alert condition based on processing the project data. For example, cloud platform 220 may identify an alert condition associated with a budget, a schedule, a quality, a likelihood of plan success, or the like. Additionally, or alternatively, cloud platform 220 may identify an alert condition based on detecting an action, such as an incoming change from a client.

In some implementations, cloud platform 220 may generate an alert based on the alert condition. For example, cloud platform 220 may generate an alert that identifies one or more impacted portions of a project (e.g., tasks, schedules, budgets, etc.), an alert message that identifies the alert condition, or the like. In some implementations, cloud platform 220 may generate an alert that identifies an automatically implemented recommendation.

In some implementations, cloud platform 220 may generate an alert that includes a direction to a portion of the project management user interface that relates to the alert (e.g., to automatically navigate the user from a portion of the user interface that the user is currently using to another portion that relates to subject matter associated with the alert).

In some implementations, cloud platform 220 may categorize an alert, such as based on a severity of the alert, a portion of a project to which the alert is relevant, a delivery type of a project to which the alert applies, or the like. For example, cloud platform 220 may categorize the alert based on processing project data, and may provide information indicating the categorization of the alert and/or perform a particular action based on categorizing the alert.

In some implementations, cloud platform 220 may generate a recommendation. For example, cloud platform 220 may generate a recommendation based on project data. In some implementations, cloud platform 220 may generate a recommendation based on project data regarding a particular project (e.g., based on actions that have been performed in the past for the particular project). Additionally, or alternatively, cloud platform 220 may generate a recommendation based on project data regarding a similar project (e.g., based on actions that have been performed in the past for the similar project). In this case, cloud platform 220 may identify the similar project based on metrics relating to the project and the similar project, based on determining that the similar project satisfies a threshold similarity score, or the like.

In some implementations, cloud platform 220 may select a recommendation (e.g., from multiple recommendations) based on a score. For example, cloud platform 220 may select a recommendation based on determining a score associated with a benefit, a cost, an ease of implementation, a feasibility, or the like (e.g., as compared to scores for other recommendations, or to a threshold).

In some implementations, cloud platform 220 may generate a recommendation to reassign tasks, change a budget, reject a change, renegotiate a change, add sprints (for agile development), increase employees, change a release schedule, or the like. In some implementations, cloud platform 220 may generate a recommendation to change a work schedule. For example, cloud platform 220 may process employee information identifying skills, proficiency levels, availability, etc., to assign, reassign, or hire employees. In this case, cloud platform 220 may determine a recommendation that a particular employee satisfies a set of threshold criteria for completing a task (e.g., a threshold skill at a particular programming language and availability during a particular period of time), and may determine to assign the particular employee to the task. As another example, cloud platform 220 may generate a recommendation to reject a change request (e.g., based on receiving the change request), to notify a client of a rejection of the change request, to renegotiate a contract automatically, and/or to schedule a change request for a next release.

As another example, cloud platform 220 may generate a recommendation to accept a change request (e.g., based on receiving the change request and determining based on past projects, releases, or the like, that the requested change can be implemented without delay despite affecting one or more critical components of the project). In this case, cloud platform 220 may generate a recommendation to adjust the schedule and/or a set of task descriptions based on the change request.

As yet another example, cloud platform 220 may generate a recommendation to run another tool to analyze the project (e.g., based on determining that the tool has not been run), to automatically run the tool, to provide results or take action based on results, or the like.

As still another example, cloud platform 220 may generate a recommendation to review information, such as based on determining that information (e.g., a project plan) has not been reviewed by the user. In this case, cloud platform 220 may automatically navigate the user from a current part of the project management user interface to the information for review, or the like.

In some implementations, cloud platform 220 may automatically implement the recommendation. For example, cloud platform 220 may implement the recommendation based on a type of the recommendation. Additionally, or alternatively, cloud platform 220 may implement the recommendation based on an amount or score relating to the recommendation (e.g., a criticality, a benefit, a cost, etc.).

As an example of automatically implementing a recommendation, cloud platform 220 may automatically implement a recommendation to reassign tasks upon determining a project is behind schedule and one or more team members has a workload that exceeds a threshold. In this case, cloud platform 220 may update information in a project management information system and may send an email or text message to relevant stakeholders, such as affected team members, a team leader of the affected team members, or the like. In reassigning tasks, cloud platform 220 may run task-related software (e.g., to analyze assignments, workload, etc.), may refer to previous task-related recommendations from the current project or similar projects, may apply a set of analytics tools (e.g., to determine which team members to assign tasks based on availability, skills, proficiencies, etc.), or the like. In some implementations, cloud platform 220 may store information relating to implementing the recommendation to improve subsequent recommendations. For example, cloud platform 220 may monitor results of implementing a recommendation, and may utilize results of implementing the recommendation as a criterion for selecting a subsequent recommendation for a subsequent project issue.

As another example of automatically implementing a recommendation, cloud platform 220 may automatically implement a recommendation to change a budget upon determining that necessary resources will require a greater or lesser expenditure than previously planned. In this case, cloud platform 220 may send an email or text message to a client device used by a client, a team leader, or the like, and/or may update budget information, such as in a project management information system and/or a data structure 250. In determining necessary resources, cloud platform 220 may run budget-related software, may refer to previous budget-related recommendations from the current project or similar projects, may apply a analytics tools (e.g., a rules engine, a cognitive computing engine, a set of algorithms, etc.), or the like.

As still another example of automatically implementing a recommendation, cloud platform 220 may automatically implement a recommendation to reject or renegotiate a requested change. In this case, cloud platform 220 may send an email or text message to a client, a team leader, or the like, communicating the rejection and/or requesting a renegotiation. Additionally, or alternatively, cloud platform 220 may facilitate a renegotiation by scheduling a meeting among relevant stakeholders. In some implementations, cloud platform 220 may utilize previous negotiations or terms from the current project or a similar project to determine terms of the renegotiation.

As further shown in FIG. 4, process 400 may include generating a virtual agent user interface component based on processing the project data (block 430). For example, cloud platform 220 may generate the virtual agent user interface component. In some implementations, cloud platform 220 may generate multiple virtual agent user interface components which each represent a different one of multiple virtual agents that perform different functions.

In some implementations, the virtual agent user interface component may include a user interface component associated with a virtual agent to monitor and provide information regarding an alert condition. For example, the virtual agent user interface component may include an icon (e.g., an icon depicting a person). In this case, the icon may include information to identify the alert condition. In some implementations, the virtual agent user interface component may represent different alerts, or different types of alerts, in different ways (e.g., different visual representations, such as a different shape, different color, a different iconography, different illustration, different animation or motion, a different level of visibility, etc.). For example, the virtual agent user interface component may represent alerts having different levels of severity with icons having different colors (e.g., blue for a general inquiry, amber for a negative warning, or red for a negative crisis).

In some implementations, a virtual agent user interface component may be associated with a role of an entity (e.g., a user, a team of users, or a company) completing a project or a role for which an alert is to be provided. In such case, the role may relate to a portion of the project managed for which alert conditions are monitored using a virtual agent (e.g., a particular virtual agent of a set of virtual agents). For example, a virtual agent user interface component may represent a scrum master, a data scientist, or a project manager. In this case, each virtual agent may monitor alert conditions similar to what a person with a corresponding role would monitor. In another example, each the virtual agent user interface component may provide information identifying an alert category, a message, a set of project components impacted by a project issue, a recommendation, a set of analytics regarding an impact of a recommendation, an action that is to be performed or was performed to remediate the project issue, or the like. In some implementations, the virtual agent user interface component may represent each different role with an icon having a different appearance (e.g., a different shape, a different color, a different illustration, a different animation, etc.).

In some implementations, cloud platform 220 may generate the virtual agent user interface component based on a template. For example, cloud platform 220 may obtain, from data structure 250, stored information identifying a set of alerts that are to be monitored, a set of representations of the virtual agent user interface component that are to be provided, or the like, and may utilize project information to complete variable portions of the virtual agent user interface component. As an example, cloud platform 220 may generate a first version of the data scientist virtual agent user interface component for an agile development project and a second version of the data scientist virtual agent user interface component for a maintenance and services project.

As further shown in FIG. 4, process 400 may include providing, using the virtual agent user interface component, information via a user interface (block 440). For example, cloud platform 220 may provide the information using the virtual agent user interface component.

In some implementations, cloud platform 220 may provide a visualization of the virtual agent user interface component via a project management user interface. For example, the visualization may include an icon in a portion of the user interface. As another example, the visualization may include a pop-up (e.g., when an alert condition satisfies a threshold criticality score).

In some implementations, cloud platform 220 may provide an alert, as described herein, using the virtual agent user interface component. For example, cloud platform 220 may cause client device 210 to display an icon of a person associated with a text balloon that includes an alert message associated with the alert.

In some implementations, cloud platform 220 may provide a recommendation, as described herein, using the virtual agent user interface component. For example, cloud platform 220 may cause client device 210 to display an icon of a person associated with a text balloon that includes a recommendation message associated with the recommendation. Additionally, or alternatively, where cloud platform 220 has automatically implemented a recommendation as described herein, cloud platform 220 may provide information indicating that the recommendation has been implemented.

In some implementations, cloud platform 220 may utilize a natural language generation technique to provide information via the virtual agent user interface component. For example, cloud platform 220 may receive text entry of natural language questions from the user and may utilize a natural language processing technique to parse the natural language questions and a analytics tools (e.g., a rules engine, a cognitive computing engine, a set of algorithms, etc.) to determine an answer to the natural language questions. In this case, cloud platform 220 may utilize the natural language generation technique to generate a natural language response to the natural language questions.

In some implementations, cloud platform 220 may receive a user interaction via the user interface and update information provided using the virtual agent user interface component. For example, cloud platform 220 may receive a user selection of a button to implement one or more recommendations, and may implement the recommendations upon receiving the user selection.

As another example, cloud platform 220 may receive voice input as voice commands, and may use a speech to text processing algorithm to identify recommendations to implement. In this case, cloud platform 220 may respond using a text to speech vocalization algorithm. In this way, user interaction may be simplified, and screen space may be conserved.

As still another example, cloud platform 220 may provide a keyword search user interface component with the virtual agent. For example, cloud platform 220 may receive a search term relating to an alert (of multiple alerts), and may use a search algorithm to identify the alert and cause the alert to be provided as search results for display via the virtual agent user interface component.

In some implementations, cloud platform 220 may filter alerts, and may provide a subset of alerts for display based on filtering the alerts. For example, cloud platform 220 may filter alerts based on severity, type, user role, user selection, or the like. In this way, cloud platform 220 reduces a quantity of information that is provided for display via the user interface, thereby reducing a utilization of computing resources and network resources associated with transmitting information relative to providing all alerts regardless of severity.

In some implementations, cloud platform 220 may use machine learning to customize functionality of the virtual agent. For example, cloud platform 220 may store information regarding user interaction with the virtual agent (e.g., dismissed alerts, requests to implement recommendations, selected recommendations, etc.). In this case, cloud platform 220 may alter information provided based on the stored information (e.g., frequency of alerts, scoring of recommendations, etc.). In this way, cloud platform 220 may learn user preferences for a single user, for many users on a single project, for a company, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, cloud platform 220 automatically administers a project by taking one or more actions, generating one or more messages, or the like. In this way, user effort may be reduced for administering a project. Moreover, processing and/or memory resources that are allocated to administering the project may be reduced relative to multiple users administering the project via multiple user devices. Furthermore, based on determining trends relating to the project, efficiency in preparing for further tasks, phases, or the like may be increased, thereby increasing project completion efficiency relative to completing the project without determining trends relating to the project.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a cloud platform of a cloud computing environment, project data associated with a project, the project data including a first set of project metrics regarding the project and a second set of project metrics regarding another project;
   processing, by the cloud platform, the project data using a set of analytics tools;
   generating, by the cloud platform, a virtual agent user interface component based on processing the project data using the set of analytics tools; and
   providing, by the cloud platform and using the virtual agent user interface component, information relating to the project via a user interface,
      the information relating to the project including a set of alerts relating to the project and a set of recommendations relating to the set of alerts;
   receiving, by the cloud platform, a selection of a particular recommendation of the set of recommendations;
   performing, by the cloud platform, one or more actions based on the selection of the particular recommendations;
   receiving, by the cloud platform, voice input for the virtual agent user interface component based on providing the virtual agent user interface component via the user interface;
   determining, by the cloud platform and based on the voice input, an instruction for the virtual agent user interface component;
   determining, by the cloud platform and based on the instruction, a particular action that is to be performed relating to the project; and
   communicating, by the cloud platform, with one or more devices to perform the particular action.

2. The method of claim 1, further comprising:
   identifying a particular alert condition relating to a particular alert of the set of alerts that corresponds to another alert condition of the other project;
   obtaining information identifying a set of actions performed for the other project to remediate the other alert condition;
   generating a recommendation, of the set of recommendations for the project, based on the set of actions performed for the other project; and
   where providing information relating to the project comprises:
      providing, using the virtual agent user interface component, the recommendation for the project.

3. The method of claim 2, where performing the one or more actions comprises:
   communicating with one or more other devices to perform another particular action, of the one or more actions, based on the recommendation for the project,
      the other particular action being associated with remediating the particular alert condition.

4. The method of claim 1, further comprising:
   receiving a search term via the virtual agent user interface component;
   determining a subset of the set of alerts relating to the search term; and
   where providing information relating to the project comprises:
      providing a set of search results via the virtual agent user interface component based on the subset of the set of alerts.

5. The method of claim 1, further comprising:
   determining scores for the set of alerts based on a severity or a portion of the project to which the set of alerts relate;
   selecting a subset of the set of alerts based on the scores; and
   where providing information relating to the project comprises:
      providing, using the virtual agent user interface component, information identifying the subset of the set of alerts.

6. The method of claim 1, where the project data includes at least one of:
   provisioning information,
   a project plan,
   a sprint plan,
   resource information,
   information identifying a change request, or
   information identifying a defect.

7. The method of claim 1, where receiving the project data comprises:
   receiving the project data based on processing a design document or a requirements document using natural language processing.

8. A device, comprising:
   a memory; and
   one or more processors, at least partially implemented in hardware, to:
      receive data regarding a project;
      automatically evaluate the data using a set of analytics tools;
      determine that an alert condition relating to an alert of a set of alerts relates to a particular role of a particular entity completing the project;

select, from a set of virtual agent user interface components associated with a set of roles, a virtual agent user interface component based on the particular role;
communicate with a client device to provide the virtual agent user interface component,
the virtual agent user interface component including information identifying the set of alerts relating to the project and a set of recommendations relating to the set of alerts;
receive information indicating that a particular recommendation, of the set of recommendations is to be implemented; and
communicate with one or more other devices to implement the particular recommendation.

9. The device of claim 8, where the one or more processors are further to:
generate a representation of the virtual agent user interface component, the representation being associated with representing a status of the project; and
where the one or more processors, when communicating with the client device to provide the virtual agent user interface component, are to:
cause the representation of the virtual agent user interface component to be provided for display via a project management user interface of the client device.

10. The device of claim 9, where the one or more processors are further to:
determine an alert condition relating to the set of alerts based on automatically evaluating the data; and
alter the representation of the virtual agent user interface component to provide an indication of the alert condition,
altering the representation of the virtual agent user interface component including an alteration to at least one of:
a color of the representation,
an iconography of the representation,
an animation of the representation,
a motion of the representation,
a visibility of the representation, or
a size of the representation.

11. The device of claim 8, where the one or more processors are further to:
generate the virtual agent user interface component using a cognitive computing functionality based on automatically evaluating the data using the set of analytics tools; and
where the one or more processors, when communicating with the client device to provide the virtual agent user interface component, are to:
provide the virtual agent user interface component based on generating the virtual agent user interface component.

12. The device of claim 8, where the one or more processors, when automatically evaluating the data, are to:
determine a value for a particular project metric relating to the project based on the data;
determine that the value for the particular project metric satisfies a threshold,
the threshold indicating an alert condition relating to the particular project metric; and
generate a particular alert, of the set of alerts, to identify the alert condition based on determining that the value for the particular project metric satisfies the threshold.

13. The device of claim 8, where the one or more processors are further to:
provide, via the virtual agent user interface component, a user interface element associated with navigating from a first portion of a project management user interface to a second portion of the project management user interface,
the second portion of the project management user interface including information relating to a particular alert of the set of alerts;
receive a selection of the user interface element based on providing the user interface element; and
causing the client device to provide the second portion of the project management user interface for display.

14. The device of claim 8, where the one or more processors, when receiving the data, are to:
receive the data based on processing a design document or a requirements document using natural language processing.

15. A non-transitory computer-readable medium storing instructions, the instructions comprising:
one or more instructions that, when executed by one or more processors, cause the one or more processors to:
generate a virtual agent user interface component for a project management user interface;
obtain project data relating to a project for management via the project management user interface;
analyze the project data using a set of analytics tools;
determine an alert relating to the project based on the project data;
provide the alert for display via the project management user interface using the virtual agent user interface component,
the virtual agent user interface component including a visual representation of the alert;
generate a set of recommendations relating to the alert;
generate a set of scores for the set of recommendations based on a cost and a benefit of the set of recommendations;
select a subset of recommendations associated with a subset of scores that satisfy a threshold; and
provide, via the virtual agent user interface component, information identifying the subset of recommendations with the alert.

16. The non-transitory computer-readable medium of claim 15, where the one or more instructions, when executed by the one or more processors, further cause the one or more processors to:
categorize the alert based on a severity of the alert; and
provide an indication of the severity of the alert via the virtual agent user interface component based on categorizing the alert.

17. The non-transitory computer-readable medium of claim 15, where the one or more instructions, when executed by the one or more processors, further cause the one or more processors to:
categorize the alert based on a delivery type of the project;
generate a recommendation for the alert based on categorizing the alert; and
provide an indication of the recommendation for the alert via the virtual agent user interface component.

18. The non-transitory computer-readable medium of claim 15, where the one or more instructions, when executed by the one or more processors, further cause the one or more processors to:

determine a portion of the project management user interface that includes information relating to the alert; and cause the portion of the project management user interface that includes information relating to the alert to be provided for display based on providing the alert for display using the virtual agent user interface component.

19. The non-transitory computer-readable medium of claim 15, where the one or more instructions, when executed by one or more processors, further cause the one or more processors to:

identify a set of other alerts relating to other portions of the project; and cause the set of other alerts to be provided via the virtual agent user interface component.

20. The non-transitory computer-readable medium of claim 15, where the one or more instructions, when executed by one or more processors to obtain the project data, further cause the one or more processors to:

obtain the project data based on processing a design document or a requirements document using natural language processing.

\* \* \* \* \*